July 5, 1927. 1,634,946
W. B. JUPP ET AL
BODY SUSPENSION FOR MOTOR VEHICLES
Filed May 27, 1924   2 Sheets-Sheet 1
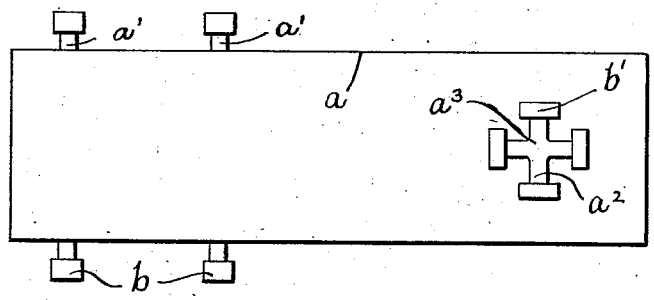
Fig.1,
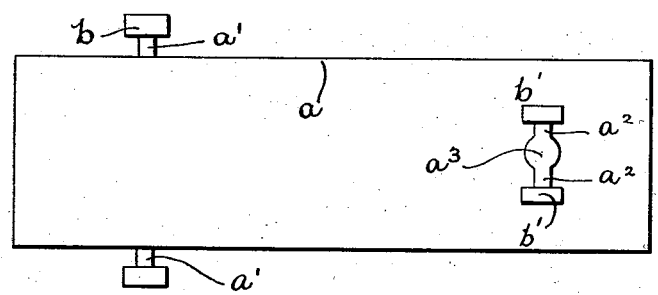
Fig.2,
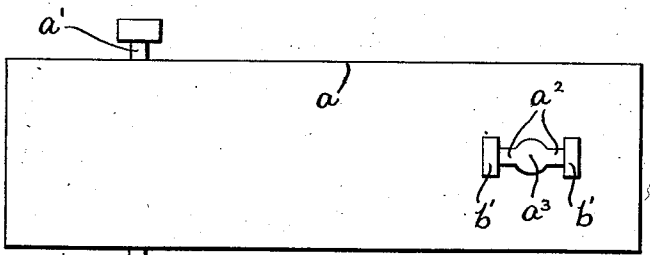
Fig.3,
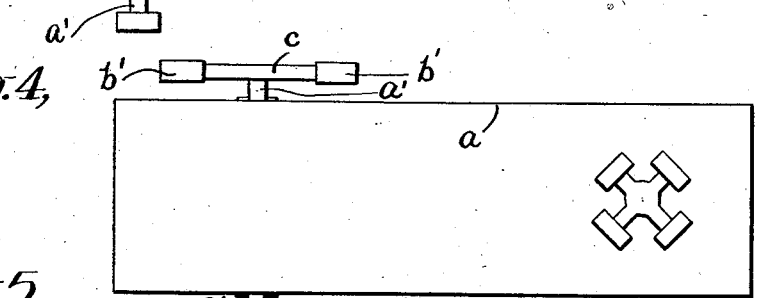
Fig.4,
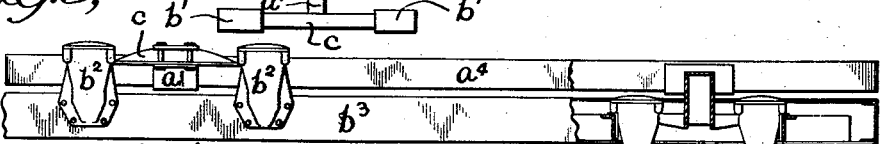
Fig.5,
William B. Jupp and George O Hanshew Inventors
By their Attorneys
Redding, Greeley, O'Shea and Campbell

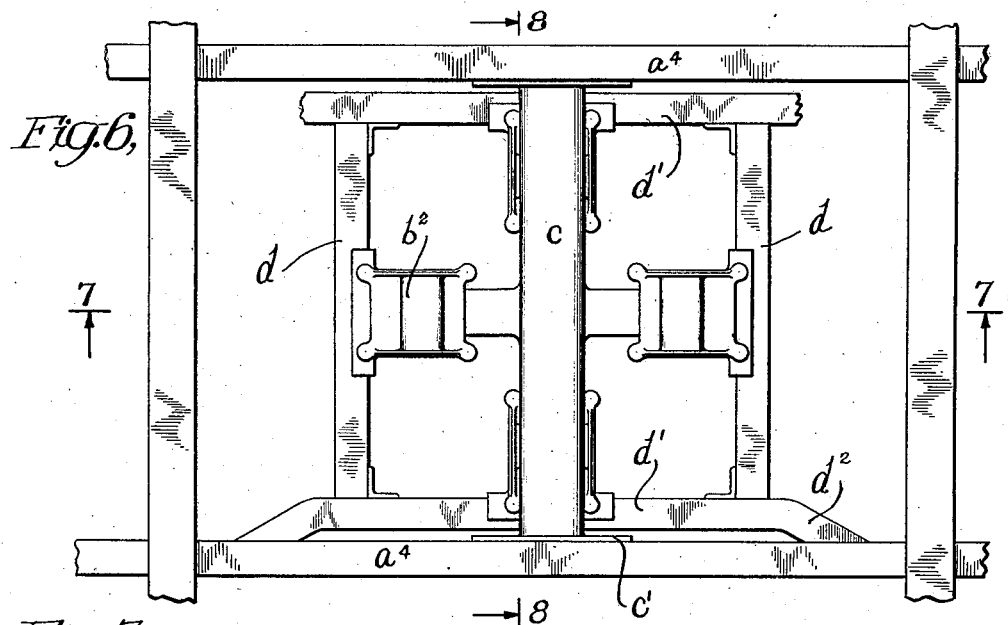
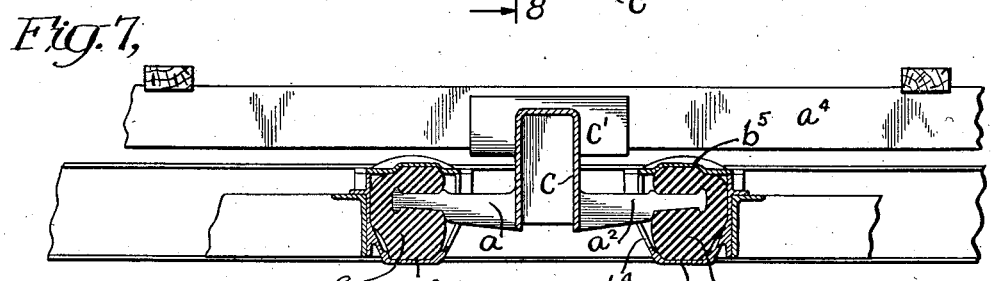
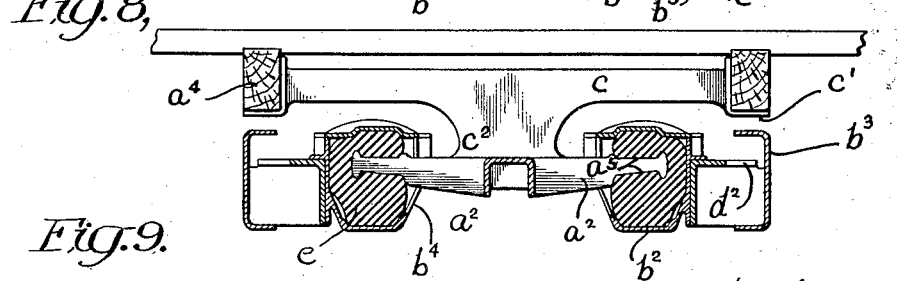
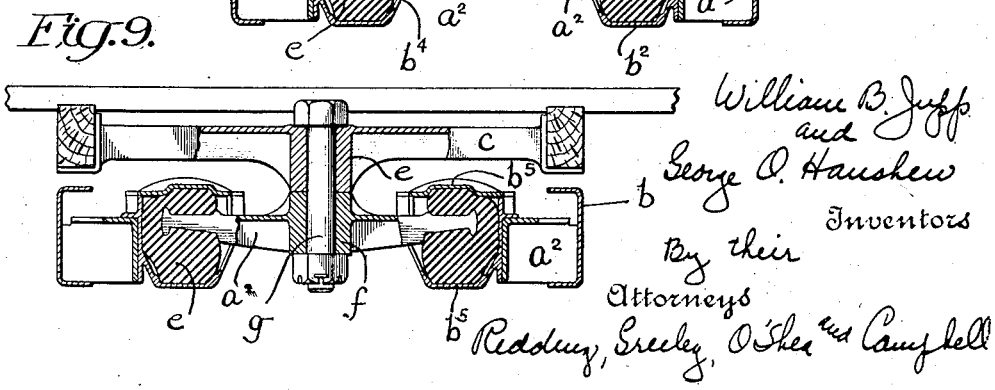

Patented July 5, 1927.

1,634,946

UNITED STATES PATENT OFFICE.

WILLIAM B. JUPP, OF NEW YORK, AND GEORGE O. HANSHEW, OF BROOKLYN, NEW YORK, ASSIGNORS TO INTERNATIONAL MOTOR COMPANY, OF NEW YORK, N. Y., A CORPORATION OF DELAWARE.

BODY SUSPENSION FOR MOTOR VEHICLES.

Application filed May 27, 1924. Serial No. 716,081.

This invention relates to the mounting of the body with respect to the frame of a vehicle and more particularly to connections and supports operatively interposed between the body and chassis frame in motor vehicles. The invention has for its object to provide a mounting which will permit a degree of relative movement between the body and vehicle frame such as will allow, for instance, the weaving of the frame due to inequalities in the road, without throwing stresses resulting therefrom upon the body of the vehicle. To this end connections and supports are provided between the body and vehicle frame which are so distributed with respect to each other as to approach or actually provide a three point support for the body. Another object of the present invention is to incorporate with the aforesaid mounting means to cushion or absorb the shocks and vibrations which may be impressed upon or set up in either the vehicle frame or the vehicle body and prevent their transmission therebetween. In a copending application Serial No. 696,931 filed March 5, 1923, it is proposed to support a body from the vehicle frame by connections of a non-metallic yielding material whereby shocks and vibrations which might be transmitted therebetween are absorbed or cushioned. The present invention seeks to utilize the broad principle disclosed in the copending application to the end that shocks or vibrations impressed upon either the body or the vehicle frame, particularly during weaving of the frame, will be cushioned or absorbed. Accordingly a series of arms are distributed upon, say the body, in such manner as to constitute a three point support therefor and the ends of these arms are engaged by yielding non-metallic material carried with, say, the vehicle frame for the purpose specified. The preferred embodiment of the invention will now be described with reference to the accompanying drawings in which;

Figure 1 is a view illustrating somewhat diagrammatically the application of the improved mounting for the body which approximates a three point support therefor.

Figures 2 and 3 are similar views showing modifications of the mounts to give a three point support.

Figure 4 is a diagrammatic view showing still another modification of the invention involving the use of springs in conjunction with the improved mounts.

Figure 5 is a view looking from the side in Figure 4 and showing more in detail a practical embodiment of the invention illustrated diagrammatically in that view.

Figure 6 is a detail view showing a preferred construction at one of the points of support.

Figure 7 is a view taken on the plane indicated by the line 7—7 in Figure 6 and looking in the direction of the arrows.

Figure 8 is a view taken on the plane indicated by the line 8—8 in Figure 6 and looking in the direction of the arrows.

Figure 9 is a detail view partly in section and partly in elevation showing a modification of the construction at a single point of support.

The invention will be described as applied to motor vehicles but it will be understood that it is equally applicable in any situation in which a body is to be supported upon a frame with provision for relative movement therebetween. Figures 1 to 4 inclusive disclose somewhat diagrammatically various modifications of the invention wherein the advantages and action of a three point support are approximated if not actually obtained. In these figures the body is indicated in outline at $a$ and is shown as provided at one end, upon opposite sides, with arms $a'$, $a'$ secured in any suitable manner to connections $b$ carried with the chassis frame (not shown). Spaced from these connections and near the other end of the vehicle is an element formed of diametrically extending arms $a^2$ connected at one central point, say $a^3$, with the body $a$ and at its ends with elements $b'$ carried with the chassis frame (not shown). In Figures 1 and 4 the arms are shown as four in number to form a Maltese cross. In Figure 1 the respective arms lie transversely to and in the longitudinal direction of the median line of the vehicle, while in Figure 4 the arms forming the Maltese cross are at an angle of 45 degrees with the median line of the vehicle. In Figures 2 and 3 only a single pair of diametrically disposed arms are disclosed. In Figure 2 the arms are shown as disposed transversely to the median line of the vehicle while in Figure 3 the arms lie along the median line. In the embodiments disclosed in Figures 2, 3 and 4, it will be apparent that the pair of arms $a'$, $a'$ disposed on opposite sides of the body near one end thereof form a two point support for that end of the body the alternative means described above forming the third point of support. In Figure 1 two pairs of arms $a'$ are shown upon each side of the vehicle near one end. While this is not a true three point support, the arms $a'$ are sufficiently near each other to approximate the desired relation of parts and in some circumstances as under condition of heavy load may be found advantageous.

The invention in one form also contemplates the incorporation of springs in the three point support. To this end the ends of the arm $a'$ may be secured to springs such as leaf springs $c$ lying in the longitudinal direction of the vehicle and secured at their ends in any convenient manner as at $b'$ to the chassis frame (not shown).

The invention also contemplates the incorporation in the three-point support of yielding non-metallic material whereby the shocks and stresses impressed upon the frame or body may be cushioned and not transmitted to the connected member. To this end blocks of yielding non-metalic material may be carried upon the chassis frame to form the connections indicated at $b$ and $b'$ in the drawings. When such blocks are used the ends of the arms $a'$ or $a^2$ will be connected to or engaged by the blocks of yielding non-metallic material to form a yielding non-metallic connection and support between the chassis frame and the body. In the practical embodiment illustrated in Figure 5 housings $b^2$ may be carried in any convenient manner with the chassis frame $b^3$. The housings are formed with openings in their proximate sides to receive the ends of a spring $c$ extending in the longitudinal direction of the vehicle and carried upon a bracket or arm $a'$ to which it is secured at its mid portion, the arm $a'$ being carried with the side frame member $a^4$ of the body $a$. While the connection forming one point of support is shown in Figure 5 at only one side of the chassis frame, it will be understood that a similar connection forming a second point of support is disposed upon the opposite side of the body in somewhat the same general arrangement as indicated in Figure 4. There is also indicated in Figure 5 the preferred type of connection constituting the third point of support. This construction is illustrated more in detail in Figures 6, 7 and 8 and reference will now be had thereto. In these figures a channel shaped element $c$ is shown as extending transversely of the vehicle and connected at its ends in any suitable manner as by bracket shaped ends $c'$ to the side frame members $a^4$ of the body. Centrally of the channel $c$ is a portion $c^2$ extending downwardly to carry diametrically disposed arms $a^2$ extending through openings $b^4$ in the proximate sides of housings $b^2$ carried with the chassis frame. In practice it will be found convenient to secure these housings to a rectangular frame formed of the transverse elements $d$, $d$ and the longitudinal elements $d'$, $d'$ bent outwardly at their ends $d^2$, $d^2$ to be secured in any convenient manner to the side frame members $b^3$ of the chassis. Within the housings are contained blocks $e$ of yielding non-metallic material such as rubber constructed in such form as to receive the ends of the arms $a^2$. Preferably the ends of the arms are formed with seats $a^5$, $a^5$ and co-operating seats $b^5$, $b^5$ are formed within the housings $b^2$ whereby the blocks may be retained more effectively under compression within the housings. It will thus be apparent that a yielding non-metallic connection and support is provided for the ends of the arms constituting elements of the three-point suspension, so that not only is the chassis frame free to weave and not stiffen by rigid connection with the body but any stocks or vibrations impressed upon either the frame or the body will be absorbed or cushioned by the rubber blocks and their transmission to the body or frame as the case may be lessened if not prevented. In practice the blocks of rubber will be retained in the housing under compression whereby their resiliency, strength and wearing qualities will be increased.

In Figure 9 a modification of the construction illustrated in Figures 6, 7 and 8 is disclosed. The channel $c$ is formed midway between its ends with a boss $e$ bored to receive a pin $g$ while the arms $a^2$ form a separate member having a similar boss $f$ at the center bored in a similar manner to receive the pin. Relative angular movement in a horizontal plane is thus permitted between the arms and the support upon the body.

While the present invention has been described as applied to a motor vehicle, the invention is equally applicable in any situation or with any kind of vehicle wherein equivalent results are to be obtained. Further, the invention is not to be limited to the precise relation of the mounts with respect to the body, but the points of support may be disposed in reverse direction whereby the single point of support $a^3$ is located near the forward end of the vehicle, or a single point of support may be disposed upon one side of the body while the proximate points of support may be located upon the opposite side thereof. This latter arrangement will be found particularly applicable in situations where a series of tanks are to be supported in their respective subframes from the chassis frame of a motor truck with provision for individual or relative movement. In this situation the connections between the respective sub-frames and vehicle frame may consist of a pair of the improved connections and supports disposed in relatively close proximity upon one side of the respective sub-frames and one of the improved connections and supports forming a single point of support upon the opposite side of the respective sub-frames.

In place of the rigid arms $a'$, $a^2$ as illustrated in the figures, springs such as leaf springs may be substituted by one skilled in the art or instead of blocks of rubber, universal joints of any convenient form may be used and mechanical equivalents are considered to be covered by the expressions used in the foregoing description and in the appended claims.

What we claim is:—

1. In combination with the chassis frame and body of a motor vehicle, arms carried on opposite sides near one end of the body, block supporting means carried upon opposite sides of the frame and having means to receive the ends of the arms, blocks of yielding non-metallic material carried by the supporting means and engaging the ends of the arms, respectively, arms adjacent the median line of the vehicle and radiating from a single point of support on the body near the other end thereof to provide, in effect a single support, block supporting means carried with the chassis frame and having means to receive the ends of said last mentioned arms, and blocks of yielding non-metallic material contained within said last mentioned means and engaging the ends of the arms.

2. In combination with the vehicle frame and body of a motor vehicle, spaced connections and supports therebetween comprising arms carried upon opposite sides near one end of the body, housings carried upon opposite sides of the frame and having open sides respectively into which the arms extend, yielding non-metallic material contained within the housings and engaging the ends of the arms, a frame formed as a Maltese cross carried on the body near the other end, housings carried with the frame and having open sides, respectively, into which the arms of the cross extend, and yielding non-metallic material contained within the housings and engaging the ends of the arms.

3. In combination with the vehicle frame and body of a motor vehicle, spaced connections and supports therebetween comprising arms carried upon opposite sides near one end of the body, housings carried upon opposite sides of the frame and having open sides, respectively, into which the arms extend, yielding non-metallic material contained within the housings and engaging the ends of the arms, a frame formed as a Maltese cross movably supported with respect to the body near the other end and in the median plane thereof, housings carried with the chassis frame and having an open side, respectively, into which the arms of the Maltese cross extend, and yielding non-metallic material contained within the housings and engaging the ends of the arms.

4. In combination with the chassis frame and body of a motor vehicle, spaced connections and supports therebetween comprising arms carried upon opposite sides of the body near one end thereof, housings carried upon opposite sides of the frame and having open sides, respectively, into which the ends of the respective arms extend, yielding non-metallic material retained within the housings and engaging the ends of the arms, a transverse element carried with the body and formed with a downwardly projecting portion disposed in the median plane of the body, diverging arms carried with said downwardly projecting portion, a rectangular frame carried with the chassis, housings carried on the frame and having open sides, respectively, into which the ends of the diverging arms extend and yielding non-metallic material retained within the housings and engaging the ends of the arms.

5. In combination with the chassis frame and body of a motor vehicle, spaced connections and supports therebetween comprising arms carried upon opposite sides of the body near one end thereof, housings carried upon opposite sides of the frame and having open sides, respectively, into which the ends of the respective arms extend, yielding non-metallic material retained within the housings and engaging the ends of the arms, a transverse element carried with the frame and having a centrally disposed boss bored to receive a connecting pin, crossed arms having a centrally disposed boss and bored to receive a connecting pin, and a connecting pin passing through the two bosses.

6. In combination with the chassis frame and body of a motor vehicle, arms carried on opposite sides and near one end of the body, housings carried upon opposite sides of the frame and having an opening in one side thereof into which the arms extend, respectively, yielding non-metallic material retained within the housings under compression, and engaging the ends of the arms, respectively, arms radiating from a single point of support near the other end of the body, housings carried with the chassis frame and having an opening in one side thereof into which the ends of the last mentioned arms extend, and yielding non-metallic material retained within said last mentioned housings under compression and engaging the ends of the arms.

7. In combination with the chassis frame and body of a motor vehicle, spaced connections and supports therebetween comprising arms carried upon opposite sides of the body near one end thereof, housings carried upon opposite sides of the frame and having open sides, respectively, into which the ends of the respective arms extend, yielding non-metallic material retained within the housings under compression and engaging the ends of the arms, respectively, and a transverse frame member carried with the body and formed centrally thereof with a downwardly projecting portion, arms forming a Maltese cross carried with said downwardly projecting portion, a rectangular frame carried with the chassis, housings carried with the frame and having open sides thereof, respectively, into which the ends of the respective arms extend, and yielding non-metallic material retained within the housings under compression and engaging the ends of the arms.

8. In combination with the chassis frame and body of a motor vehicle, arms carried on opposite sides and near one end of the body, housings carried upon opposite sides of the frame and having an opening in one side thereof, respectively, into which the respective ends of the arms extend, seats formed on the ends of the respective arms, co-operating seats formed within the housings, yielding non-metallic material retained between the seats under compression and engaging the ends of the arms, respectively, arms radiating from a single point of support on the body near the other end thereof, housings carried with the chassis frame and having an opening in one side thereof, respectively, into which the ends of the last mentioned arms extend, respectively, seats formed on the ends of said last mentioned arms, co-operating seats formed within said last mentioned housings, and yielding non-metallic material retained between said seats under compression and engaging the ends of the arms.

9. In combination with the chassis frame and body of a motor vehicle, spaced connections and supports therebetween comprising arms carried upon opposite sides of the body near one end thereof, housings carried upon opposite sides of the frame and having an opening in one side thereof, respectively, into which the ends of the respective arms extend, seats formed on the ends of the arms, respectively, co-operating seats formed in the housings, yielding non-metallic material retained between the seats under compression, a transverse element carried with the body and formed at its mid portion with a downwardly projecting portion, diverging arms carried with said downwardly projecting portion, a rectangular frame carried with the chassis, housings carried on the frame and having an opening in one side thereof, respectively, into which the ends of the respective arms extend, seats formed on the ends, respectively, co-operating seats formed in the housings, and yielding non-metallic material retained between the seats under compression.

This specification signed this 23 day of May, A. D. 1924.

WILLIAM B. JUPP.
GEORGE O. HANSHEW.